United States Patent Office 3,810,918
Patented May 14, 1974

3,810,918
SYNTHESIS OF ZEARALANONE
Wilbert Herbert Urry, Chicago, Ill., and Guy Towns Mullenbach, Berkeley, Calif., assignors to Commercial Solvent Corporation, Terre Haute, Ind.
No Drawing. Filed Apr. 25, 1972, Ser. No. 247,344
Int. Cl. C07d 9/00
U.S. Cl. 260—343.2 F     1 Claim

ABSTRACT OF THE DISCLOSURE

This invention provides a new synthesis for zearalanone and for related compounds having more or fewer carbon atoms in the non-aromatic ring than does zearalanone, which related compounds and zearalanone are represented by the formula

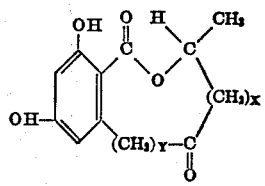

wherein X is an integer having a value from 2 to 6 inclusive and Y is an integer having a value from 2 to 8 inclusive. It also provides for new methods for making compounds useful in the synthesis of zearalanone and related compounds.

The new compounds useful as intermediates are 2,7-octadienoic acid;
methyl 2,7-octadienoate;
sodium ethyl 6-(4-pentenyl)-β-dihydroresorcylate;
ethyl 6-(4-pentenyl)-β-dihydroresorcylate;
sodium methyl 6-(4-pentenyl)-β-dihydroresorcylate;
methyl 6-(4-pentenyl)-β-dihydroresorcylate;
methyl 3-bromo-6-(4-pentenyl)-β-dihydroresorcylate;
methyl 6-(4-pentenyl)-β-resorcylate;
ethyl 6-(4-pentenyl)-β-resorcylate;
ethyl 6-(4-pentenyl)-β-resorcylate dibenzyl ether;
tetrahydropyran-2-yl 4-penten-2-yl ether;
ethyl 6-(6-oxo-10-tetrahydropyran-2-xyloxyundecyl)-β-resorcylate dibenzyl ether; and
6-(10-hydroxy-6-oxoundecyl)-β-resorcylic acid dibenzyl ether.

Methods for preparing these intermediates are also disclosed.

BRIEF SUMMARY OF THE INVENTION

The present invention is directed to a new process for the manufacture of zearalanone and related compounds, which related compounds and zearalanone are represented by the formula

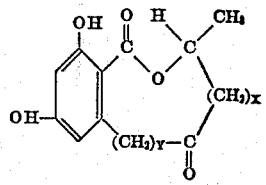

wherein X is an integer having a value from 2 to 6 inclusive and Y is an integer having a value from 2 to 8 inclusive. More specifically the invention relates to a process for making all of the foregoing compounds by a new series of process steps utilizing new intermediate compounds.

It is an object of the present invention to provide a new means for synthesizing zearalanone and related compounds.

It is another object of the invention to provide new intermediates useful in the preparation of zearalanone and related compounds.

It is a further object of the invention to provide new processes for producing intermediate compounds useful in the synthesis of zearalanone and related compounds.

DETAILED DESCRIPTION

Zearalanone, whose synthesis is one of the objects of this invention, has the structure illustrated by the formula:

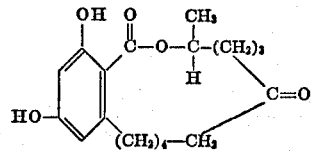

An examination of the above formula reveals that it has one asymmetric carbon atom and the compound produced by synthesis exists, therefore, as two enantiomorphs designated as D and L by the older Fischer convention and by R and S by the newer convention of Cahn and Ingold (Cahn, R. S. and Ingold, C. K., *J. Chem. Soc.* 612, (1951); Cahn, R. S., *J. Chem. Educ.*, 41, 116 (1964)).

Zearalanone produced by the reduction of natural zearalanone has the same S configuration as does the parent compound. The chemical name for zearalanone is: 6-(10-hydroxy-6-keto-undecyl)-β-resorcylic acid lactone. Zearalanone was one of the compounds described and claimed in U.S. Letters Patent No. 3,239,341 issued Mar. 8, 1966, to Hodge et al. The compound was prepared by the reduction of a natural product zearalanone, sometimes referred to as F.E.S. resulting from the fermentation of suitable nutrient media using the organism *Gibberella zeae* (Gordon) on deposit at the Northern Utilization Research and Development Division of the United States Department of Agriculture at Peoria, Ill., under the number NRRL–2830. The reduction was carried out by hydrogen under the influence of a catalyst such as palladium or platinum on char in a menstruum of ethyl alcohol (Tetrahedron Letters, No. 27, pp. 3109–3114, 1966).

The present invention encompasses the discovery that zearalanone can be made readily by the sequence of reactions illustrated in Chart I.

The first step in the sequence is the pyrolysis of 3-hydroxy-1,5-hexadiene to prepare 5-hexenal which is reacted with malonic acid to form 2,7-octadienoic acid. The foregoing acid is esterified by treatment with diazomethane and the resulting methyl ester is reacted with the sodium salt of ethyl acetoacetate under the influence of sodium methoxide in a methanol menstruum to yield the sodium salt of methyl 6-(4-pentenyl)-β-dihydroresorcylate. The dihydroresorcylate sodium salt is then brominated at low temperature to form methyl 3-bromo-6-(4-pentenyl)-β-dihydroresorcylate which is de-hydrobrominated by treatment with sodium ethoxide in an anhydrous ethanol menstruum to prepare ethyl 6-(4-pentenyl)-β-resorcylate. The foregoing resorcylate is reacted with benzyl chloride to yield ethyl 6-(4-pentenyl)-β-resorcylate dibenzyl ether. The foregoing compound is reacted with tetrahydropyran-2-yl 4-penten-2-yl ether by successive treatment with 2,3-dimethyl-2-butylborane, carbon monoxide, sodium acetate solution, and hydrogen peroxide to give ethyl 6-(6-oxo-10-tetrahydropyran-2-yloxy-undecyl)-β-resorcylate dibenzyl ether which is treated with sodium hydroxide and then with hydrochloric acid to yield 6-(10-hydroxy-6-oxoundecyl)-β-resorcylic acid dibenzyl ether. The foregoing compound is subjected to the action of trifluoroacetic anhydride to effect ring closure and form zearalanone dibenzyl ether. On hydrogenation of the dibenzyl ether, (R,S)-zearalanone is formed.

CHART I.—BETA
Reactions for the chemical synthesis of (R,S)-zearalanone

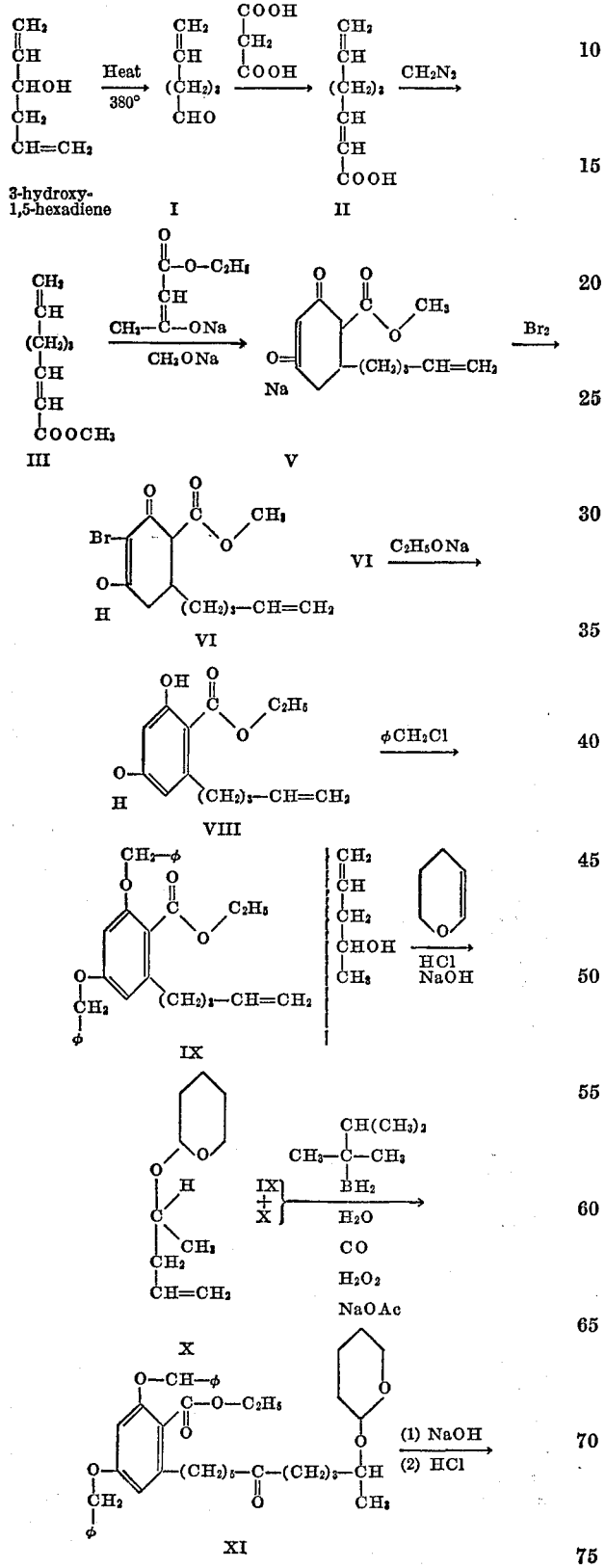

Notes.—φCH₂Cl designates benzyl chloride; NaOAc is sodium acetate.

The foregoing sequence of reactions, as well as the reactions described in the specific examples, can be carried out with appropriate starting materials to yield compounds related to (R,S)-zearalanone. They can be represented by the following formula:

where X and Y are integers which can take the values:

X = 2, 3, 4, 5, or 6
Y = 2, 3, 4, 5, 6, 7, or 8.

The values of X and Y for zearalanone are underscored.
For example, in order to prepare the compound where X=2 and Y=2, it would be necessary to start with acrolein (CH₂=CH—CHO) as Compound I in Chart I and to react 3-buten-2-ol with dihydropyran to form tetrahydropyran-2-yl 3-buten-2-yl ether as Compound X in the sequence of reactions in Chart I.

The compounds produced by the process of this invention are useful in promoting the growth rate of meat-producing animals. The compounds can be administered to animals by any suitable method including subcutaneous injection of pellets under the skin of the ears of mammals as well as by oral and parenteral administrations. For example, the compounds can be formulated into pellets and put under the skin of the ear by a suitable gun or they can be suspended in a medium such as peanut oil and injected parenterally. The compounds can also be blended with ordinary feed containing nutritional values in an amount sufficient to produce the desired rate of growth and can thus be fed directly to animals.

When the compounds are to be fed directly to animals, the feed composition can be prepared containing the usual nutritionally balanced quantities of fats, carbohydrates, proteins, vitamins, and minerals together with the chosen compound. Some of these usual dietary elements are grains, such as ground grain and grain by-products; animal protein substances such as those found in fish meal and meat scraps; animal and vegetable fats; vegetable proteins like soybean oil meal or peanut oil meal; vitaminaceous materials, e.g. vitamin A and D mixtures; riboflavin supplements and other vitamin B complex members; antibiotic supplements such as zinc bacitracin feed grade; and bone meal and limestone to provide minerals. A type of conventional feed material for use with cattle includes alfalfa hay and ground corn cobs together with supplementary antibiotics and vitaminaceous materials if desired.

The amount of compound administered to the animal, of course depends upon the specific animal, its age and sex, and the desired rate of growth. Usually, administration of from about 1 to about 100 mg. of a compound per animal per day produces significantly increased growth rate.

The following examples serve to illustrate the invention and set forth the best mode contemplated by the inventors for carrying out the invention. In the following specific examples, the specific compounds used are such that in the general formulae presented herein $X=3$ and $Y=5$. The specific reactions, however, are illustrative of the more general reactions when the compounds are generally represented with X being an integer of 2 to 6 (i.e., 2, 3, 4, 5 or 6) and Y being an integer of 2 to 8 (i.e. 2, 3, 4, 5, 6, 7 or 8). In the following described general reactions the letters W and Z are also used to represent integers with W being an integer of from 0 to 6 (i.e., 0, 1, 2, 3, 4, 5 or 6) and Z being an integer from 0 to 4 (i.e. 0, 1, 2, 3, or 4). It should also be noted that a relationship exists between X and Z, such that when zearalanone or a related compound is described with the X in the general formula e.g. $X=3$, the Z compound should be selected such that $Z=X-2$ or in this illustration with $X=3$, Z would equal 1. Similarly, a relationship exists between W and Y, such that when a zearalanone or a related compound is described with the Y in the general formula e.g. $Y=5$, the W compound should be selected such that $W=Y-2$ or in this illustration with $Y=5$, W would equal 3.

The abbreviations used in the following examples are described in these paragraphs. The description of a nuclear magnetic resonance (NMR) scan is identified by the letters NMR followed by the solvent and reference substance placed in parenthesis; thus, NMR ($CDCl_3$, TMS) means that the scan was made with deuterated chloroform as the solvent and tetramethylsilane as the reference substance. The position of the identified peaks may be described by the value:

$\delta$=cycles per second from TMS divided by sixty (this relation applies with a 60 megaherz instrument)
$\delta$=c.p.s.$\div$60
or by $\tau$=ten minus $\delta$ (10−$\delta$).

The type of peak is shown by the first letter of the word describing the peak and is followed by a numeral indicating the number of hydrogen atoms involved. Examples are as follows:

s., 1=singlet, one hydrogen
s., 2=singlet, two hydrogens
d., 1=doublet, one hydrogen
t., 2=triplet, two hydrogens
m., 4=multiplet, four hydrogens broad, s., 1=a broad singlet for one hydrogen which may result from O$\underline{H}$, COO$\underline{H}$, C$\underline{H}$O.

Coupling constants are valuble for identification of the positions of hydrogen atoms and with respect to variations of the electronic environments. The coupling constants are measured as the distance between the peaks in question on the x-axis of the scan and are recorded as J values in terms of c.p.s.

Cycles per second are denoted by c.p.s. and by Hz.

In all of the examples, the temperatures are in degrees centigrade. In the NMR data, TMS is a tetramethylsilane; DSS is sodium 2,2 - dimethyl-2-silapentane-5-sulfonate.

EXAMPLE 1

This example illustrates the preparation of 5-hexenal I by the following reaction:

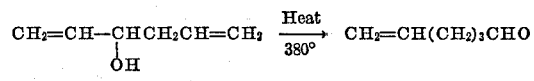

3-hydroxy-1,5-hexadiene      I 190 g., 1.94 mols, of 3-hydroxy-1,5-hexadiene was slowly distilled through a 50 cm. column packed with 3 mm. Pyrex helices maintained at 380°. Fractional distillation of the pyrolysis mixture gave 111.2 g., 1.14 mols (59 percent), of 5-hexanal; B.P. 57.5° (57 mm.); B.P. 120–21° (760 mm.)

Although 5-hexenal is not a new compound, it is not readily available and, therefore, the above described step describes a known method for the preparation thereof.

EXAMPLE 2

This example illustrates the preparation of 2,7-octadienoic acid II by the following general reaction wherein $W=3$.

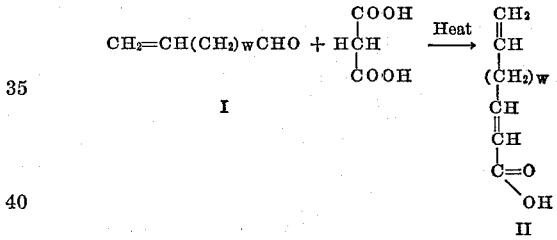

A reaction mixture containing 76.9 g., 0.784 mol, of 5-hexenal I, 90.0 g., 0.865 mol, of malonic acid, and 145 ml. of pyridine was stirred at 25° under nitrogen for 60 hr. An additional 45.0 g. of malonic acid was added to it, and stirring was continued for 24 hr, at 25°. It was then heated on a steam bath until carbon dioxide evolution ceased (20 hr.). Water (145 ml.) was added to it, and the resulting mixture was extracted with ether (3× 200 ml.). The extract was washed with dilute hydrochloric acid (2 N, 2× 50 ml.), water (2× 50 ml.), and dried ($Na_2SO_4$). Fractional distillation gave 83.0 g., 0.593 mol (76 percent), of II: B.P. 86–87° (0.15 mm.); NMR ($CDCl_3$, TMS) $\delta$ 12.34 (s., 1, COO$\underline{H}$), 7.26 and 6.98 (2 t., 1, $J_{AB}$=15.7 Hz., $J_{AX}$=7 Hz., $\overline{CH_2CH}$=CH), 5.97 and 5.70 (2 t., 1, $J_{AB}$=15.7 Hz., $J_{BX}$=1 Hz., C$\underline{H}$COO), 5.72, 4.92 and 4.88 (3 m., 3, C$\underline{H}$=C$\underline{H_2}$), 2.12 (br. m., 4, $C\underline{H_2}CH=CH_2$), and 1.60 p.p.m. (br. m., 2, $CH_2C\underline{H_2}CH_2$).

Analysis.—Calcd. for $C_8H_{12}O_2$ (percent): C, 68.6; H, 8.6. Found (percent): C, 68.6; H, 8.7.

EXAMPLE 3

This example illustrates the preparation of methyl 2,7-octadienoate, III, by the following general reaction wherein $W=3$:

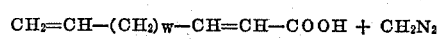

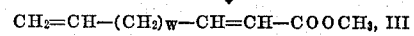

A solution of diazomethane in ether was added to a cold (0°) solution of 83.0 g., 0.592 mol, of II in 200 ml. of ether until a yellow color persisted. Evaporation of the reaction mixture gave 90.3 g. of crude III that was fractionally distilled to give 80.2 g., 0.520 mol (88 percent) of III: B.P. 44–45° (0.70 mm.); NMR (CDCl₃, TMS) δ 7.04 and 6.78 (2 t., 1, $J_{AB}$=15.7 Hz., $J_{AX}$=7 Hz., CH₂C$\underline{H}$=CH), 5.87 and 5.61 (2 t., 1, $J_{AB}$=15.7 Hz., $J_{BX}$=1 Hz., C$\underline{H}$CO), 5.72, 4.92 and 4.88 (3 m., 3, C$\underline{H}$=C$\underline{H}_2$), 3.67 (s., 3, C$\underline{H}_3$), 2.12 (br. m., 4, C$\underline{H}_2$CH=CH), and 1.58 p.p.m. (br. m., 2, CH₂C$\underline{H}_2$CH₂).

Analysis.—Calcd. for C₉H₁₄O₂ (percent): C, 70.2; H, 9.1. Found (percent): C, 70.1; H, 9.2.

EXAMPLE 4

This example illustrates the preparation of ethyl 6-(4-pentenyl)-β-dihydroresorcylate sodium salt IV by the following reaction wherein W=3:

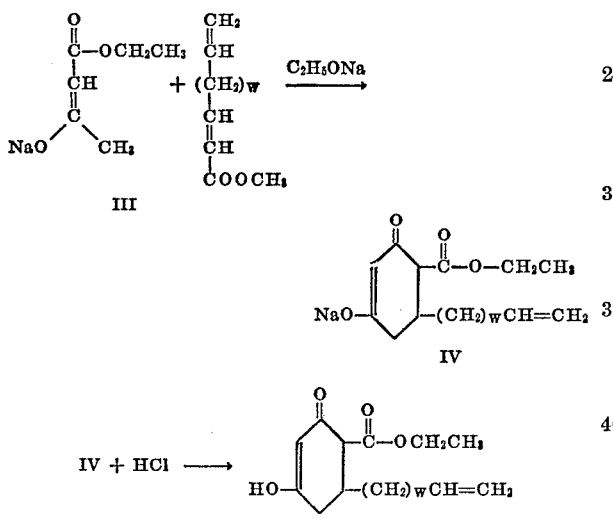

81.4 g., 0.626 mol, of freshly-distilled ethyl acetoacetate was added dropwise to a stirred solution of sodium ethoxide prepared from 14.4 g., 0.626 g.-atom of sodium and 200 ml. of ethanol under nitrogen. The resulting solution was held at reflux while 80.2 g., 0.521 mol, of III was added dropwise, and then such heating was continued with mechanical stirring for 22 hr. The solid that precipitated during the reaction and while the mixture was cooled to 0° was removed on a filter, and it was washed with ether to give 110.80 g., 0.404 mol (78 percent), of white IV: NMR (D₂O, DSS, integration of some ring hydrogen atoms not given since they exchanged) δ 5.72, 4.92 and 4.88 (3 m., 3, C$\underline{H}_2$=C$\underline{H}$), 4.22 (q., 2, J=7 Hz., COOC$\underline{H}_2$), 3.18 (d., J=10 Hz., $\underline{H}$CCOO), 2.20 (m., OCC$\underline{H}_2$CH), 2.00 (br. m., 2, C$\underline{H}_2$CH=CH₂), 1.33 (br. m., 5, C$\underline{H}$(C$\underline{H}_2$)₂CH₂), and 1.26 p.p.m. (t., 3, J=7 Hz., C$\underline{H}_3$).

Then a solution of 3.00 g., 0.0109 mol, of IV in 50 ml. of water was acidified with 3 N hydrochloric acid and the resulting mixture was extracted with ether (4× 25 ml.). The extract was washed with water (4× 25 ml.), dried (MgSO₄), and evaporated in a Rinco evaporator, a well-known and widely used vacuum rotary evaporator hereinafter referred to as "Rinco," to give a residue which crystallized from ligroin (B.P. 60–68°) to give 2.37 g., 0.00942 mol (86 percent) of ethyl 6-(4-pentenyl)-β-dihydroresorcylate: M.P. 72.5–73.5°; NMR (CDCL₃, TMS) δ 12.32 (s., 0.2, 2-O$\underline{H}$), 9.75 (s., 0.8, 4-O$\underline{H}$), 5.72, 4.92 and 4.88 (3 m., 3, C$\underline{H}$=C$\underline{H}_2$), 5.52 (s., 0.8, 3-C$\underline{H}$), 4.29 and 4.22 (2 q., J=7 Hz., COOC$\underline{H}_2$), 3.12 (s., 0.4, 3-C$\underline{H}_2$), 3.15 (d., 0.8, J=10 Hz., 1-C$\underline{H}$), 2.45 (m., ca. 2, 5-C$\underline{H}_2$), 2.06 (br. m., 2, C$\underline{H}_2$CH=CH₂), 1.36 (br. m., 5, C$\underline{H}$(C$\underline{H}_2$)₂CH₂), and 1.29 p.p.m. (t., 3, J=7 Hz., C$\underline{H}_3$).

Analysis.—Calcd. for C₁₄H₂₀O₄ (percent): C, 66.7; H, 8.0. Found (percent): C, 66.7; H, 8.0.

EXAMPLE 5

This example illustrates the preparation of methyl 6-(4-pentenyl)-β-dihydroresorcylate sodium salt V by the following general reaction where W=3:

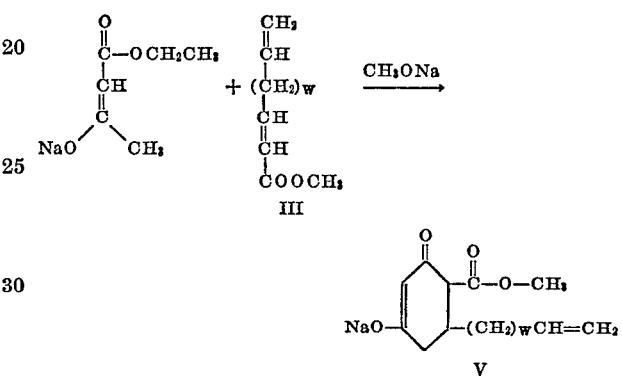

The reaction mixture was prepared by dropwise addition of 70.7 g., 0.598 mol, of ethyl acetoacetate to a solution of 32.3 g., 0.598 mol of sodium methoxide in 130 ml. of methanol stirred under nitrogen, and then 74.2 g., 0.482 mol of III was also added dropwise. It was held at reflux with mechanical stirring for 20 hr. About 60 ml. of its solvent was removed under vacuum, and it was cooled to 0°. A precipitate that formed during the above was removed on a filter and washed with ether until it was white to give 84.7 g., 0.326 mol (68 percent), of V: NMR (D₂O, DSS): again exchange of hydrogen atoms on the ring occurred. δ 5.72, 4.92 and 4.88 (3 m., 3, C$\underline{H}$=C$\underline{H}_2$), 5.07 (s., OCC$\underline{H}$CO), 3.18 (d. J=10 Hz., $\underline{H}$CCOO), 2.20 (m., OCC$\underline{H}_2$CH), 2.00 (br. m., 2, C$\underline{H}_2$CH=CH₂), and 1.33 p.p.m. (br. m., 5, C$\underline{H}$(C$\underline{H}_2$)₂CH₂)

The NMR spectrum is nearly the same as IV above, except for the alkoxy absorptions.

The compound V may readily be acidified to prepare methyl 6-(4-pentenyl)-β-dihydroresorcylate Va by the following general reaction wherein W=3:

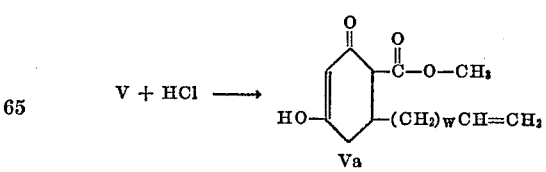

Methyl 6-(4-pentenyl)-β-dihydroresorcylate when W=3

And in turn the compound Va may be reacted with sodium hydroxide to form V. Converting the sodium salt V to Va and then treating Va with sodium hydroxide to again form the sodium salt V, of course, provides an efficient method for preparing relatively pure V.

EXAMPLE 6

This example illustrates the preparation of methyl 3-bromo-6-(4-pentenyl)-β-dihydroresorcylate VI by the following general reaction wherein $W=3$:

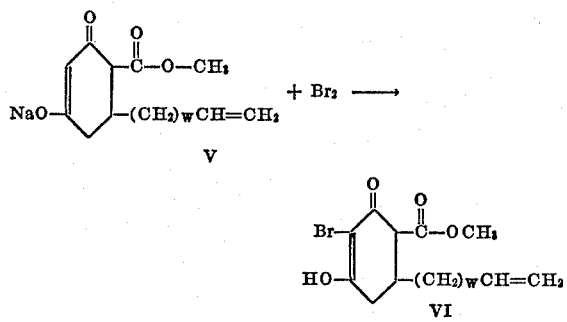

A solution of 58.2 g., 0.326 mol, of bromine and 193.1 g., 1.87 mol, of sodium bromide in 200 ml. of water was added dropwise over 6 hr. to a rapidly stirred solution of 84.7 g., 0.326 mol, of V in 700 ml. of water cooled to 0°. After 30 min., the solid that had precipitated was removed by filtration. It was dissolved in 200 ml. of ether, and the resulting solution was washed with water (3× 150 ml.), and briefly dried (MgSO$_4$). It was evaporated (Rinco, 25°), and the residue was recrystallized from 200 ml. of ether and pentane to give 70.4 g., 0.222 mol (68 percent), of white crystalline VI: M.P. 91–93°: NMR (CDCl$_3$, TMS) δ 8.10 (s., 1, 4-OH), 5.72, 4.92 and 4.88 (3 m., 3, CH=CH$_2$), 3.77 (s., 3, CH$_3$), 3.35 (d., 1, J=10 Hz., HCCOO), 2.72 (dd., 1, J$_{AB}$=20.4 Hz., J$_{AX}$=11.0 Hz., OCCH$_2$CH), 2.43 (dd., 1, J$_{AB}$=20.4 Hz., J$_{BX}$=8.6 Hz., OCCH$_2$CH), 2.06 (br. m., 2,

CH$_2$CH=CH$_2$)

and 1.45 p.p.m. (br. m., 5, CH(CH$_2$)$_2$CH$_2$).

*Analysis.*—Calcd. for C$_{13}$H$_{17}$O$_3$Br (percent): C, 49.2; H, 5.4; Br, 25.2. Found (percent): C, 48.9; H, 5.7; Br, 25.2.

In Example 6, the temperature at which the reaction of bromine with Compound V is allowed to occur is kept at 0° C. in order to minimize the reaction of bromine with the double bond in the side chain of the compound. Temperatures up to 25° C. could be used for this reaction but 0° C. is preferred. A lower temperature limit of about −10° C. is set since the rate of the desired reaction becomes too low at temperatures much below −10° C. because the reaction mixture would freeze.

EXAMPLE 7

This example illustrates the preparation of methyl 6-(4-pentenyl)-β-resorcylate VII by the following general reaction wherein $W=3$, and R=methyl:

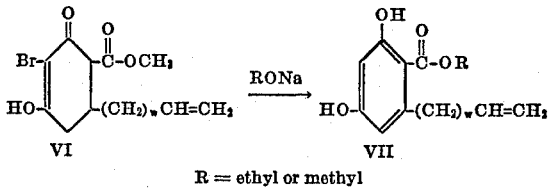

R = ethyl or methyl

A solution of 21.5 g., 0.0678 mol, of VI and sodium methoxide (prepared from 15.6 g., 0.678 g.-atom of sodium) in 350 ml. of anhydrous methanol was maintained at reflux under nitrogen for 9 hr. Then 200 ml. of methanol was evaporated under vacuum. The reaction mixture was held at 0° while enough water to give 400 ml. of the mixture was added to it. It was acidified with sulfuric acid (6 N), and extracted with ether (3× 200 ml.). The extract was washed with water (4× 200 ml.), and it was decolorized with charcoal, and evaporated (Rinco) to yield 14.9 g., 0.0632 mol (93 percent), of crude VII. Purification by dry column chromatography (300 g. silica gel H, 10 percent ethyl ether in methylene chloride) yielded fractions that gave product that was recrystallized from ligroin (60–68°) to give 8.82 g., 0.0373 mol (55 percent), of pure VII: M.P. 55–56°; NMR (CDCl$_3$, TMS) δ 11.83 (s., 1, hydrogen bonded 2-OH), 6.90 (s., 1, 4-OH), 6.33 and 6.30 (2 d., 2, J=2 Hz., aromatic CH), 5.72, 4.92 and 4.88 (3 m., 3, CH=CH$_2$), 3.82 (s., 3, CH$_3$), 2.82 (t., 2, J=7 Hz., ArCH$_2$), 2.08 (br. m., 2, CH$_2$CH=CH$_2$), and 1.64 p.p.m. (br. m., 2, CH$_2$CH$_2$CH$_2$).

*Analysis.*—Calcd. for C$_{13}$H$_{16}$O$_4$ (percent): C, 66.2; H, 6.8. Found (percent): C, 66.1; H, 6.7.

EXAMPLE 8

This example illustrates the preparation of ethyl 6-(4-pentenyl)-β-resorcylate VIII by the following general reaction wherein $W=3$ and R=ethyl:

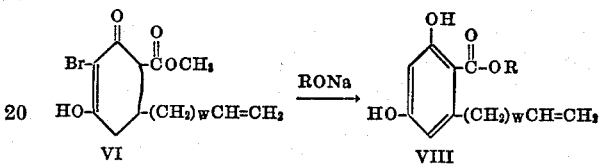

A solution containing 19.33 g., 0.0610 mol, of VI, and sodium ethoxide (prepared from 9.00 g., 0.391 g.-atom, of sodium and in the 250 ml. of ethanol) was held at reflux under nitrogen for 6 hr., and then it was evaporated under vacuum until its volume was about 100 ml. It was diluted with water to 300 ml., and acidified with sulfuric acid (6 N) while it was held at 0°. The resulting mixture was extracted with ether (3× 150 ml.). The extract was then washed with water (4× 100 ml.), decolorized with charcoal, and evaporated (Rinco) to yield 14.0 g., 0.0562 mol (92 percent), of crude VIII. Dry column chromatography (300 g. silica gel H, 10 percent ethyl ether in methylene chloride) gave 9.15 g., 0.0366 mol (60 percent), of VIII: NMR (CDCl$_3$, TMS) δ 11.95 (s., 1, 4-OH), 7.42 (s., 1, 4-OH), 6.33 and 6.30 (2 d., 2, J=2 Hz., aromatic CH), 5.72, 4.92 and 4.88 (3 m., 3, CH=CH$_2$), 4.40 (q., 2, J=7 Hz., COOCH$_2$), 2.85 (t., 2, J=7 Hz., ArCH$_2$), 2.03 (m., 2, CH$_2$CH=CH$_2$), 1.64 (br. m., 2,

CH$_2$CH$_2$CH$_2$)

and 1.40 p.p.m. (t., 3, J=7 Hz., CH$_3$). Except for the expected differences, this NMR spectrum is the same as that of VII.

In Example 8 the de-hydrobromination of Compound VI can be effected at temperatures in the range 60° C.–120° C. but a temperature near 80° C. is preferred. At a temperature of 80° C. the rate of de-hydrobromination is reasonably fast and side reactions are minimal.

The de-hydrobromination step could be carried out in a menstruum of an alcohol other than ethanol, for example methanol or butanol.

EXAMPLE 9

This example illustrates the preparation of ethyl 6-(4-pentenyl)-β-resorcylate dibenzyl ether IX by the following general reaction wherein $W=3$ and R=ethyl:

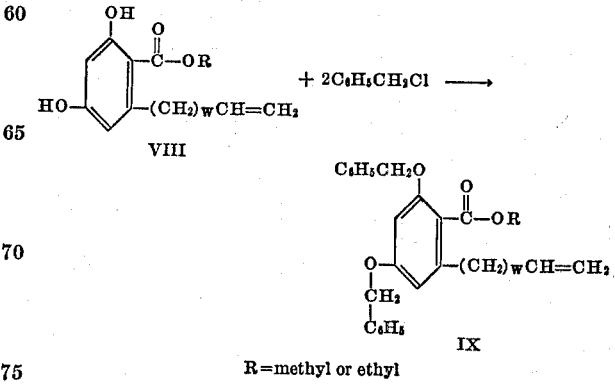

R=methyl or ethyl

A mixture of 31.5 g., 0.126 mol, VIII, 60.5 g. of anhydrous potassium carbonate, and 31.5 ml. 0.274 mol, of benzyl chloride in 300 ml. of dimethylsulfoxide was stirred on a steam bath for 6 hr. 1.0 l. of water was added to it while it was stirred, and then it was held overnight at $-15°$. The product that had crystallized was collected on a filter, and it was recrystallized from a mixture of ethyl ether and ligroin (B.P. 60–68°) to give 45.5 g., 0.106 mol (84 percent), of IX: M.P. 49–51°; NMR (CDCl$_3$ TMS) $\delta$ 7.32 (m., 10, C$_6$H$_5$), 6.44 (s., 2, aromatic CH), 5.72, 4.92 and 4.88 (3 m., 3, CH=CH$_2$), 4.98 and 4.96 (2 s., 4, C$_6$H$_5$CH$_2$), 4.28 (q., 2, J=7 Hz., COOCH$_2$), 2.58 (t., 2, J=7 Hz., ArCH$_2$), 2.00 (m., 2, $$CH_2CH=CH_2)$$

1.64 (br. m., 2, CH$_2$CH$_2$CH$_2$), and 1.23 p.p.m. (t., 3, J=7 Hz., CH$_3$).

*Analysis.*—Calcd. for C$_{28}$H$_{30}$O$_4$ (percent): C, 78.2; H, 7.0. Found (percent): C, 78.0; H, 6.9.

EXAMPLE 10

This example illustrates the preparation of tetrahydropyran-2-yl 4-penten-2-yl ether X by the following general reaction wherein Z=1:

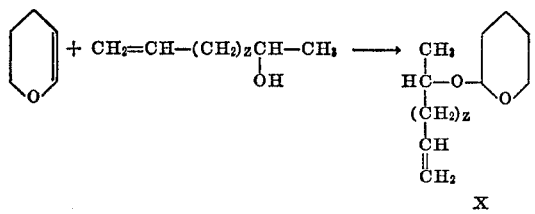

Six drops of concentrated hydrochloric acid were slowly added to a stirred solution containing 25.0 g., 0.291 mol, of 4-penten-2-ol and 26.6 ml., 0.291 mol, of dihydropyran held at 0°. It was stirred at 25° under nitrogen for 20 hrs. Then several sodium hydroxide pellets were added to it, and it was stirred for another 0.5 hr. Its fractional distillation gave 42.7 g., 0.251 mol (86 percent), of the ether X: B.P. 48.5–49.5° (2.4 mm.); NMR (CDCl$_3$, TMS) $\delta$ 5.72, 4.92 and 4.88 (3 m., 3, CH=CH$_2$), 4.63 (m., 1, OCHO), 3.64 (br. m., 3, CH$_2$O and CH$_3$CHO), 2.23 (br. m., 2, CH$_2$CH=$_2$), 1.58 (br. m., 6, CH (CH$_2$)$_3$CH$_2$), and 1.13 p.p.m. (d., 3, J=7 Hz., CH$_3$).

*Analysis.*—Calcd. for C$_{10}$H$_{18}$O$_2$ (percent): C, 70.6; H, 10.7. Found (percent): C, 70.8; H, 10.6.

In Example 10, the formation of Compound X is carried out at a temperature of 25° C. The temperature should not be allowed to go much above this value, but a temperature as low as $-20°$ C. can be used. The rate of ether formation is, of course, lower the lower the temperature at which the reaction is effected.

EXAMPLE 11

This example illustrates the preparation of ethyl 6-(6-oxo-10-tetrahydropyran - 2 - yloxy-undecyl)-$\beta$-resorcylate dibenzyl ether XI by the following general reaction wherein Z=1, R=ethyl, W=3, X=3 and Y=5:

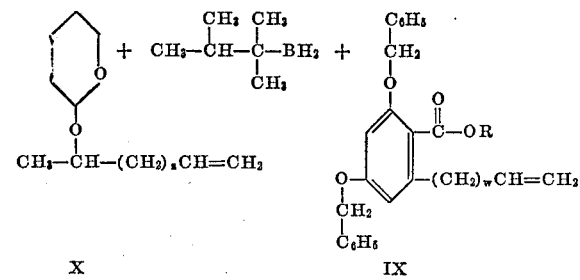

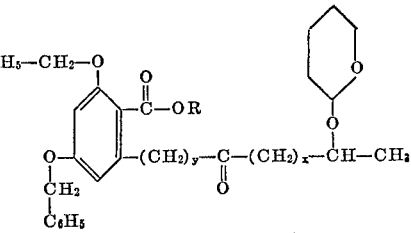

XI 2.19 ml., 0.00465 mol, of 2.12 M diborane in tetrahydrofuran was injected via rubber septum into a one neck, 100 ml. round bottomed flask containing 15 ml. of tetrahydrofuran (distilled from calcium hydride) and equipped with a nitrogen seal, efficient magnetic stirring and ice bath cooling. Then 0.550 ml., 0.391 g., 0.00465 mol, of 2,3-dimethyl-2-butene was injected. After 1.25 hrs. of stirring at 0°, 0.792 g., 0.00465 mol, of tetrahydropyran-2-yl 4-penten-2-yl ether X was injected over 2 min. while cooling and stirring was continued. After 1.25 hrs, 2.00 g., 0.00465 mol, of IX in 7 ml. of tetrahydrofuran was injected into the rapidly stirred and cooled solution during two min. An additional 5 ml. of tetrahydrofuran, used to rinse the syringe, was also injected, and stirring at 0° was maintained for 14.5 hrs. Then 0.167 ml., 0.00928 mol, of water was injected, a large-bore hypodermic needle was placed through the septum, and the flask, so equipped, was sealed in a high pressure autoclave that had been thoroughly flushed with nitrogen. The autoclave was then heated at 60° for 11 hrs. under 54 atm. of carbon monoxide (C.P.). During the first two hours the autoclave was inverted four times. At the end of the heating period, it was slowly vented, and the flask was again placed under a nitrogen seal. At 25° and with rapid stirring, 1.55 ml., 0.00465 mol, of 3.0 M sodium acetate and 1.55 ml., 0.0137 mol, of 30 percent hydrogen peroxide were injected in rapid succession. The reaction mixture was maintained at 50° in an oil bath with stirring for 3 hrs. It was then evaporated (Rinco), and the residue was extracted with ether. The extract was washed with saturated potassium carbonate (1×15 ml.) and water (3×15 ml.). It was dried (Na$_2$SO$_4$ and K$_2$CO$_3$), and evaporated to give 2.61 g. of viscous residue. NMR analysis indicated that 55–65 percent of this crude product was XI ca. 1.56 g., 0.00248 mol (53 percent); NMR (CDCl$_3$, TMS) $\delta$ 7.32 (m., 10, C$_6$H$_5$), 6.44 (s., 2, aromatic CH), 4.98 and 4.96 (2 s., 4, C$_6$H$_5$CH$_2$), 4.66 (br. m., 1, OCHO), 4.28 (q., 2, J=7 Hz., COOCH$_2$), 3.65 (br. m., 3, CH$_2$O and HCO), 2.58 (t., 2, J=7 Hz., ArCH$_2$), 2.37 (t., 4, J=7 Hz., CH$_2$COCH$_2$), 1.55 (br. m., 16, COCH$_2$(CH$_2$)$_3$CH$_2$, COCH$_2$(CH$_2$)$_2$CH, and CH(CH$_2$)$_3$CH$_2$O), 1.23 (t., 3, J=7 Hz., CH$_2$CH$_3$), and 1.14 p.p.m. (d., 3, J=7 Hz., CHCH$_3$).

In Example 11, the reaction involving carbon monoxide is conducted at 60° C. Temperatures much above this value give unwanted side reactions. Lower temperatures down to room temperature can be used if a longer reaction time can be tolerated. An increase in carbon monoxide pressure will, of course, increase the reaction rate and make lower temperatures more acceptable.

EXAMPLE 12

This example illustrates the preparation of 6-(10-hydroxy - 6 - oxo-undecyl)-$\beta$-resorcylic acid dibenzyl ether XII by the following general reaction wherein R=ethyl, $X=3$ and $Y=5$:

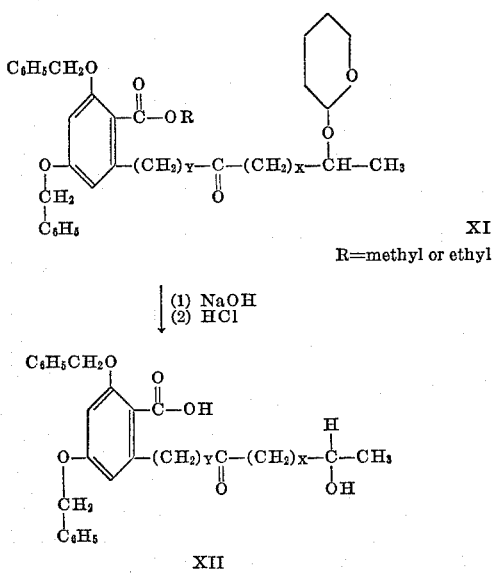

R=methyl or ethyl

XII

A solution of 1.40 g. of crude XI (ca. 60 percent purity; 0.00133 mol of XI) in 30 ml. of dimethylsulfoxide and 18 ml. of 20 percent sodium hydroxide was gently refluxed under nitrogen for 7.5 hr. (120°). It was then acidified with dilute hydrochloric acid. The organic layer was diluted with chloroform, separated, and washed with water (3× 20 ml.). Evaporation of this chloroform solution (Rinco) gave a residue. It was dissolved in 1.0 ml. of concentrated hydrochloric acid and 50 ml. of acetone, and the reaction mixture was held at reflux under nitrogen for 15 min. Then 200 ml. of water was added to it, and the resulting mixture was evaporated (Rinco) to remove low boiling impurities. A solution of the residue in 50 ml. of ether was washed with water until neutral, dried (MgSO$_4$), and evaporated (Rinco) to leave 1.11 g. of residue containing ca. 45 percent (from NMR spectrum), ca. 0.498 g., 0.00096 mol (72 percent yield) of XII: NMR (CDCl$_3$, TMS) δ 8.88 (br. s., 2, COO$\underline{H}$ and O$\underline{H}$), 7.33 (s., 10, C$_6\underline{H}_5$), 6.45 (s., 2, aromatic C$\underline{H}$), 5.01 and 4.98 (2 s., 4, C$_6$H$_5$C$\underline{H}_2$), 3.77 (br. m., 1, C$\underline{H}$CH$_3$), 2.75 (t., 2, J=6 Hz., ArC$\underline{H}_2$), 2.33 (t., 4, J=7 Hz., C$\underline{H}_2$COC$\underline{H}_2$), 1.53 (br. m., 10, CH$_2$(C$\underline{H}_2$)$_3$CH$_2$ and (C$\underline{H}_2$)$_2$C$\underline{H}$), and 1.14 p.p.m. (d., 3, J=6.5 Hz., C$\underline{H}_3$).

The temperature at which Compound XI is treated with sodium hydroxide can be increased from 120° C. up to about 160° C. Temperatures considerably below 120° C. can be used, for example 80° C., but the time for the reaction to go to completion is greatly increased.

EXAMPLE 13

This example illustrates the preparation of zearalanone dibenzyl ether XIII by the following general reaction wherein $X=3$ and $Y=5$:

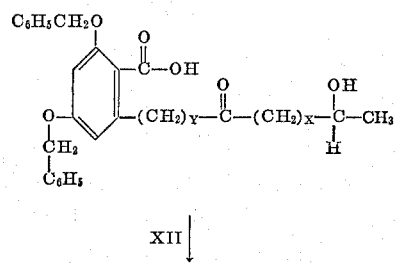

XII

XII

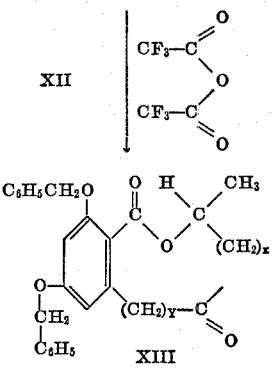

A solution of 0.591 g. of crude XII (ca. 45 percent purity prepared above) and 0.239 g., 1.14×10$^{-3}$ mol, of freshly prepared trifluoroacetic anhydride in 200 ml. of anhydrous benzene containing 5 g. of Linde 3A molecular sieves was stirred for 23 hr. at 6° under nitrogen. Then analysis of it by thin layer chromatography (silica gel, 10 percent ethyl acetate in benzene) gave no indication of XIII. Consequently, a second equivalent, 0.239 g. of trifluoroacetic anhydride was added, and stirring at 6° was continued. For the same reason, additional equivalents of anhydride were added according to the following schedule: 78 hr., third equivalent; 127 hr., fourth equivalent; 142 hr., fifth and sixth equivalent. After 218 hr. thin layer chromatography as above still gave no clear evidence for the presence of XIII, but 50 ml. of 5 percent sodium hydroxide was added to the reaction mixture while it was stirred. The organic layer was separated and washed with hydrochloric acid (4 N), saturated sodium chloride solution (4× 50 ml.), and water (1× 50 ml.). After it had been dried (MgSO$_4$), it was evaporated to give 0.54 g. of residue which was purified by dry column chromatography (40 g. of silica gel H, 10 percent ethyl acetate in benzene). Residual product from fractions containing XIII (TLC) was recrystallized from ligroin (60–68°) to give 0.0566 g., 1.13×10$^{-4}$ mol (ca. 22 percent based upon XII in its crude mixture) of XIII: M.P. 103–105°; mass spectrum (70 ev.) m/e (rel. intensity) 500(6), 482(2), 409(2), 391(2), 181(6), 91(100), 69(2), 65(4), 32(2), 28(8). The mass spectrum is identical to that of the dibenzyl ether of zearalenone prepared from natural zearalenone. The melting point is the same as that of XIII prepared via other methods, and mixed melting points were not depressed.

EXAMPLE 14

This example illustrates the preparation of DL-zearalanone XIV by the following general reaction wherein $X=3$ and $Y=5$:

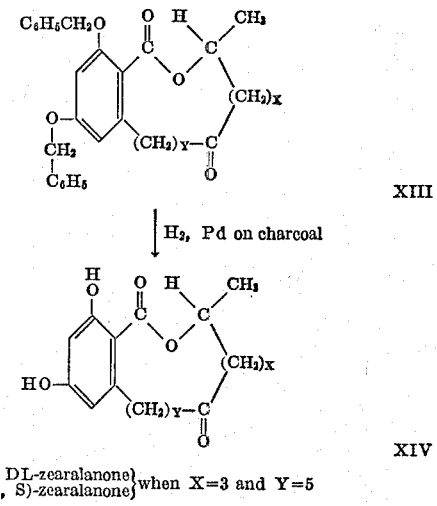

DL-zearalanone  
(R, S)-zearalanone } when $X=3$ and $Y=5$

A solution of 0.100 g., 0.0002 mol, of XIII in 10.0 ml. of ethyl acetate and 4.0 ml. of absolute ethanol with 0.05 g. of 10 percent palladium on charcoal catalyst and three drops of triethylamine added was hydrogenated at 1 atm. until hydrogen consumption ceased. The reaction mixture was then filtered and evaporated (Rinco), and the residue was purified by preparative thin layer chromatography (silica gel, 10 percent ethyl acetate in benzene) to give 0.054 g., 0.000169 mol (84 percent), of XIV; M.P. 208–210° (from acetone); NMR (acetone-$d_6$, TMS) $\delta$ 11.87 (br. s., 1, 2-O$\underline{H}$), 6.32 (d., 1, J=2.5 Hz., aromatic C$\underline{H}$), 6.28 (d., 1, J=2.5 Hz., aromatic C$\underline{H}$), 7.34 (br. s., 1, 4-O$\underline{H}$), 5.20 (br. m., 1, COOC$\underline{H}$), 3.02 and 2.74 (2 br. m., 6, ArC$\underline{H}_2$ and C$\underline{H}_2$COC$\underline{H}_2$), 2.50 to 1.20 (very br. m., 10, CH$_2$(C$\underline{H}_2$)$_3$CH$_2$ and CH(C$\underline{H}_2$)$_2$CH$_2$), and 1.32 p.p.m. (d., 3, J=6.0 Hz., C$\underline{H}_3$); mass spectrum (70 ev) m/e (rel. intensity) 320(35), 302(19), 251(19), 177(36), 163(98), 150(35), 69(46), 55(76), 41(100). These NMR and mass spectra are identical to those of naturally-derived S-zearalanone.

What is claimed is:

1. A method for the chemical synthesis of (R,S)-zearalanone which comprises the steps of
   (a) reacting 5-hexenal with malonic acid to prepare 2,7-octadienoic acid;
   (b) reacting 2,7-octadienoic acid with diazomethane to prepare methyl 2,7-octadienoate;
   (c) reacting methyl 2,7-octadienoate with the sodium salt of acetoacetic ester in the presence of methanol and sodium methoxide to prepare the sodium salt of methyl 6-(4-pentenyl)-β-dihydroresorcylate;
   (d) reacting the sodium salt of methyl 6-(4-pentenyl)-β-dihydroresorcylate with bromine to prepare methyl 3-bromo-6-(4-pentenyl)-β-dihydroresorcylate;
   (e) reacting methyl 3-bromo-6-(4-pentenyl)-β-dihydroresorcylate with sodium ethoxide to prepare ethyl 6-(4-pentenyl)-β-resorcylate;
   (f) reacting ethyl 6-(4-pentenyl)-β-resorcylate with benzyl chloride to prepare ethyl 6-(4-pentenyl)-β-resorcylate dibenzyl ether;
   (g) reacting dihydropyran with 4-penten-2-ol to prepare tetrahydropyran-2-yl 4-penten-2-yl ether;
   (h) reacting tetrahydropyran-2-yl 4-penten-2-yl ether with 2,3-dimethylbutyl borane and then with ethyl 6-(4-pentenyl)-β-resorcylate to give a tertiary alkyl borane that is reacted with carbon monoxide under super-atmospheric pressure and then with hydrogen peroxide to prepare ethyl 6-(6-oxo-10-tetrahydropyran-2-yloxyundecyl)-β-resorcylate dibenzyl ether;
   (i) reacting ethyl 6 - (6 - oxo-10-tetrahydropyran-2-yloxy-undecyl)-β-resorcylate dibenzyl ether successively with base and with acid to prepare 6-(10-hydroxy-6-oxo-undecyl)-β-resorcylic acid dibenzyl ether.
   (j) treating 6-(10-hydroxy-6-oxo-undecyl)-8-resorcylic acid dibenzyl ether with trifluoroacetic anhydride in dilute solution to prepare (R,S)-zearalanone dibenzyl ether;
   (k) reacting (R,S)-zearalanone dibenzyl ether with hydrogen to prepare (R,S)-zearalanone.

References Cited
UNITED STATES PATENTS
3,624,144   11/1971   Wendler et al. _____ 260—343.2

OTHER REFERENCES
Urry et al.: Tetrahedron Letters, vol. No. 27, 66. 3109–14 (1966).

JOHN M. FORD, Primary Examiner

U.S. Cl. X.R.

99—2 G; 260—345.8, 345.9, 468 R, 473 S, 486 R, 514 R, 521 R, 526 N; 424—279

UNITED STATES PATENT OFFICE
CERTIFICATE OF CORRECTION

Patent No. 3,810,918      Dated May 14, 1974

Inventor(s) WILBERT HERBERT URRY and GUY TOWNS MULLENBACH

It is certified that error appears in the above-identified patent and that said Letters Patent are hereby corrected as shown below:

COLUMN 3, line 19, the sub-script "5" is illegible.

6, lines 62 and 63, the word "(percent)" in each instance should be omitted.

7, lines 13 and 15, the word "(percent)" in each instance should be omitted.

8, line 6, "(2 q., J = 7 Hz., $COOCH_2$)," should read --(2 q., 2, J = 7 Hz., $COO\underline{CH}_2$),--.

, lines 10 and 11, the word "(percent)" in each instance should be omitted.

9, lines 37 and 38, the word "(percent)" in each instance should be omitted.

10, lines 9 and 10, the word "(percent)" in each instance should be omitted.

, line 15, the "W" should have an underscore beneath it and read --$\underline{W}$--.

, line 16, in the formula, there should be a double bond leading from the "OH" down to the hexagon, rather than the single bond now shown.

11, lines 18 and 19, the word "(percent)" in each instance should be omitted.

, line 44, the "H" in the formula "$CH_2$)" should be underscored and read --$\underline{CH}_2$--.

UNITED STATES PATENT OFFICE
CERTIFICATE OF CORRECTION

PAGE TWO

Patent No. 3,810,918     Dated May 14, 1974

Inventor(s) WILBERT HERBERT URRY and GUY TOWNS MULLENBACH

It is certified that error appears in the above-identified patent and that said Letters Patent are hereby corrected as shown below:

, line 45, "(br. m., 2 $CH_2$CH=2)," should read --(br. m., 2, $CH_2$CH=$CH_2$),--.

, line 46, the "$CH_2$)" should be underscored and should read --$CH_2$--.

, lines 48 and 49, the word "(percent)" in each instance should be omitted.

Signed and sealed this 14th day of January 1975.

(SEAL)
Attest:

McCOY M. GIBSON JR.
Attesting Officer

C. MARSHALL DANN
Commissioner of Patents